C. C. FINN.
DATE RECORDING ATTACHMENT FOR CAMERAS.
APPLICATION FILED MAR. 11, 1914.
1,146,755.
Patented July 13, 1915.
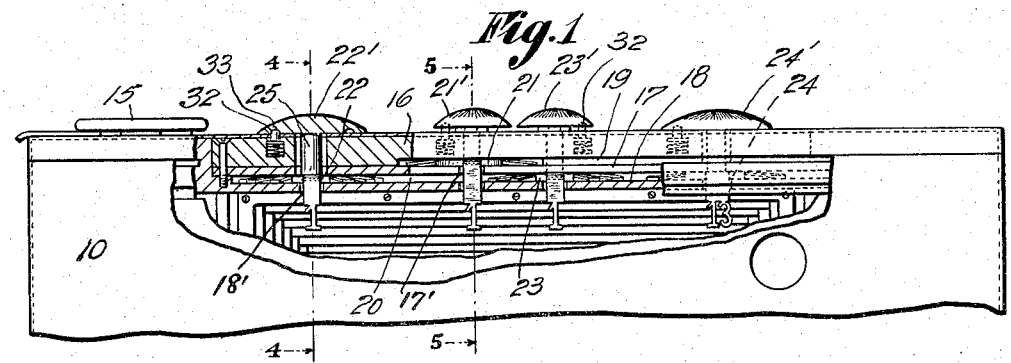
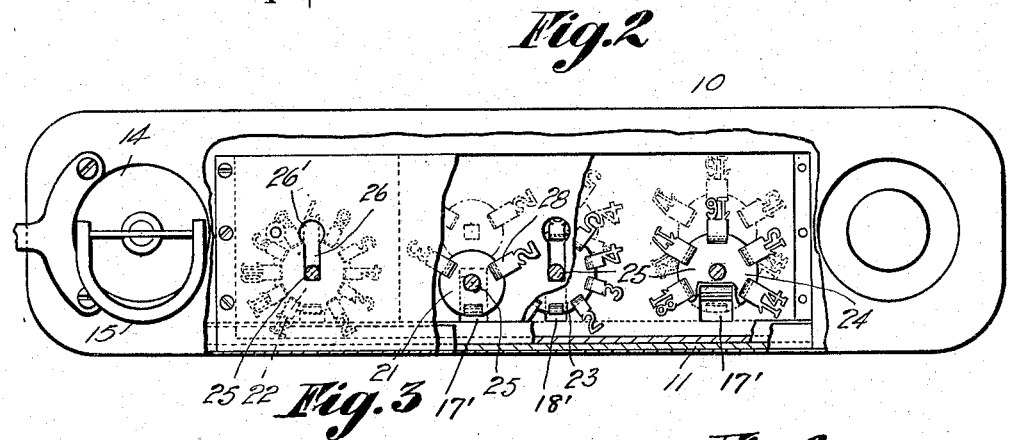
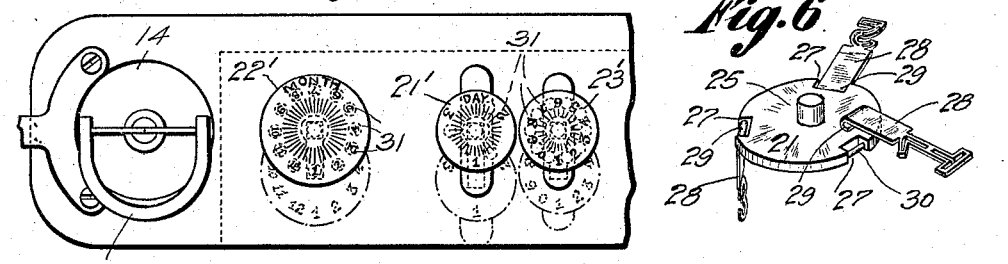
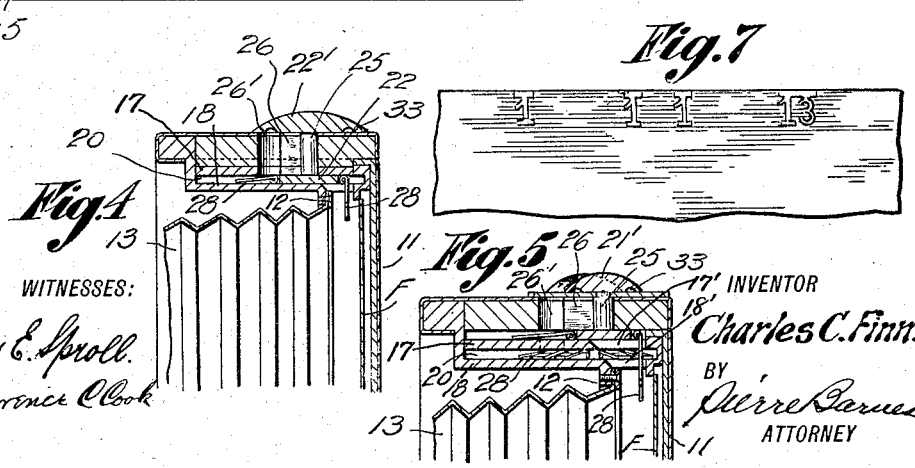
WITNESSES:
James E. Sproll.
Clarence C. Cook
INVENTOR
Charles C. Finn.
BY
Pierre Barnes
ATTORNEY

UNITED STATES PATENT OFFICE.

CHARLES C. FINN, OF SEATTLE, WASHINGTON.

DATE-RECORDING ATTACHMENT FOR CAMERAS.

1,146,755.  Specification of Letters Patent.  Patented July 13, 1915.

Application filed March 11, 1914. Serial No. 823,908.

*To all whom it may concern:*

Be it known that I, CHARLES C. FINN, a citizen of the United States, residing at Seattle, in the county of King and State of Washington, have invented certain new and useful Improvements in Date-Recording Attachments for Cameras, of which the following is a specification.

This invention relates to photography; and its object is to provide devices within a camera which may be conveniently regulated from outside the latter whereby numerals or other symbols may be indicated on the negative films to denote the date when the same were exposed.

The invention consists in certain novel devices and combinations thereof, wherein series of numerals or equivalent denoting characters denoting the date when exposures were made, may be selectively interposed between the camera lens and the sensitized negative film so as to mask a portion of the film with respect to the light rays transmitted through the lens thereby causing the film to be affected in such manner that representations of the numerals or other characters will be subsequently developed upon the negative and appear on all photographic prints therefrom.

In the accompanying drawings, Figure 1 is a view partly in front elevation and partly in transverse vertical section, of a camera with the present invention applied thereto. Fig. 2 is a plan view with a portion of the camera case broken away. Fig. 3 is an exterior plan view of a part of the camera. Figs. 4 and 5 are longitudinal vertical sections through 4—4 and 5—5 of Fig. 1. Fig. 6 is a perspective view of a group of numeral plates and a rotary carrier therefor, one of the plates being shown detached. Fig. 7 is a fragmentary view of a negative with the date-indicating characters thereon.

The reference numeral 10 designates the case of a camera having a removable back 11. At a short distance from said back the case-walls are provided with inwardly projecting ribs, such as 12, Figs. 4 and 5, to which the rear end of the bellows member 13 is secured. Said bellows member is connected at its front end with the usual lens-carrying frame, which is not shown.

F represents the sensitized film which, as usual, is unwound from a spool at one side of the case and thence led across the rear of said chamber to be wound about a spool at the other side of the case.

14 represents the rotary element which engages the last mentioned spool for turning the same and is accordingly provided with a finger-engaging handle 15.

Subjacent to the top wall 16 of the case are horizontal partitions 17 and 18 which are spaced to afford a compartment 19 between said wall and the upper partition and a second compartment 20 between the partitions.

Located in compartment 19 is horizontally arranged disk 21 and a plurality of such disks, 22, 23 and 24, are provided in the compartment 20. Each of said disks is provided with an axially disposed stem 25 which extends upwardly to above the case-wall 16. Above the latter, the respective stems are provided with heads $21^1$, $22^1$, $23^1$ and $24^1$ whereby the various movements of the disks may be individually controlled. Longitudinal slots 26 are provided in said casing-wall for the disk stems and are of widths equal to the diameters of the stem, except that at the forward ends, the slots are desirably enlarged, as at $26^1$, to permit the stems being freely rotated when positioned therein.

Recesses 27 are provided in the peripheries of the disks to accommodate the ends of sign-plates or number-plates 28 which are each provided with a loop 29, Fig. 6, for making hinged connection with a pin, such as 30, extending across the respective recess. The sign-plates of disk 22 are utilized to designate the calendar months and are accordingly formed at their free ends in the shapes of figures from 1 to 12, inclusive. The next two groups of sign-plates, which are carried by disks 21 and 23, are employed to designate the days of the month, the sign-plates of disk 21 being accordingly in the form of figures 1 to 3, inclusive, and those of the other disk 23, of figures 0, 1, 2, etc., to 9. The sign-plates of the remaining disk 24 are designed to denote the year within the current century, as "13", "14", "15", etc. Index marks, such as 31, Fig. 3, are provided on the respective heads $21^1$, $22^1$, etc., to indicate the circumferential positions of the various sign-plates of the associated disks. For each head is provided in the casing-wall 16 a spring-pressed bolt 32 which is adapted to engage in holes 33 provided in the several heads. There is one of such holes for each sign-plate and it is located so that when a disk is positioned to have its stem within the enlarged portion $26^1$ of a slot 26 the holes will be successively engaged by a bolt when the heads are suitably turned to present selected ones of the sign-plates in predetermined position. After the sign-plates have been thus revolubly moved through the agency of the respective heads, the operator, by means of the latter, shoves each disk forwardly until the free end of the selected sign-plate thereof will drop through apertures $17^1$ and $18^1$ provided in the partitions to extend downwardly into the camera chamber in front of the film F. By such interposition of the sign-plates between the camera lens and the film, it is evident that the sign-plates will partially mask or project shadows upon the film when an exposure is made so that an impression will be produced upon the latter when the same is developed.

To substitute a sign-plate for one that is pendent from its disk, the head for that disk is shoved forwardly moving the disk therewith, and when the pendent plate encounters the partition upon which the disk is located, the plate is swung thereby upwardly into the same plane with the disk, whereupon the disk may be rotated, as before explained, to present the desired plate in position such that when the disk is returned to its rearmost position, it will swing downwardly through the aperture $17^1$ or $18^1$ therefor in the respective partitions.

The construction and operation of the invention will, it is thought, be understood from the foregoing description.

What I claim, is—

1. In a camera, a disk, a plurality of numerals hingedly connected to the periphery of said disk, means for rotating and imparting reciprocatory movements to said disk whereby selected of said numerals may be brought into position to screen portions of the sensitive surface in the camera when said surface is exposed.

2. In a camera, a disk within the camera, a plurality of numerals hingedly connected to the periphery of said disk, means extending exteriorly of the camera for rotating and imparting reciprocatory movements to said disk whereby selected of said numerals may be brought from an inoperative position into position to screen portions of the sensitive surface in the camera, whereby such portions are not affected when the sensitive surface is exposed, and means to prevent the substituting of another of said numerals until after the disk is returned to its original inoperative position.

Signed at Seattle, Wash., this 2nd day of March 1914.

CHARLES C. FINN.

Witnesses:
  E. PETERSON,
  HORACE BARNES.

Copies of this patent may be obtained for five cents each, by addressing the "Commissioner of Patents, Washington, D. C."